Figure 1:
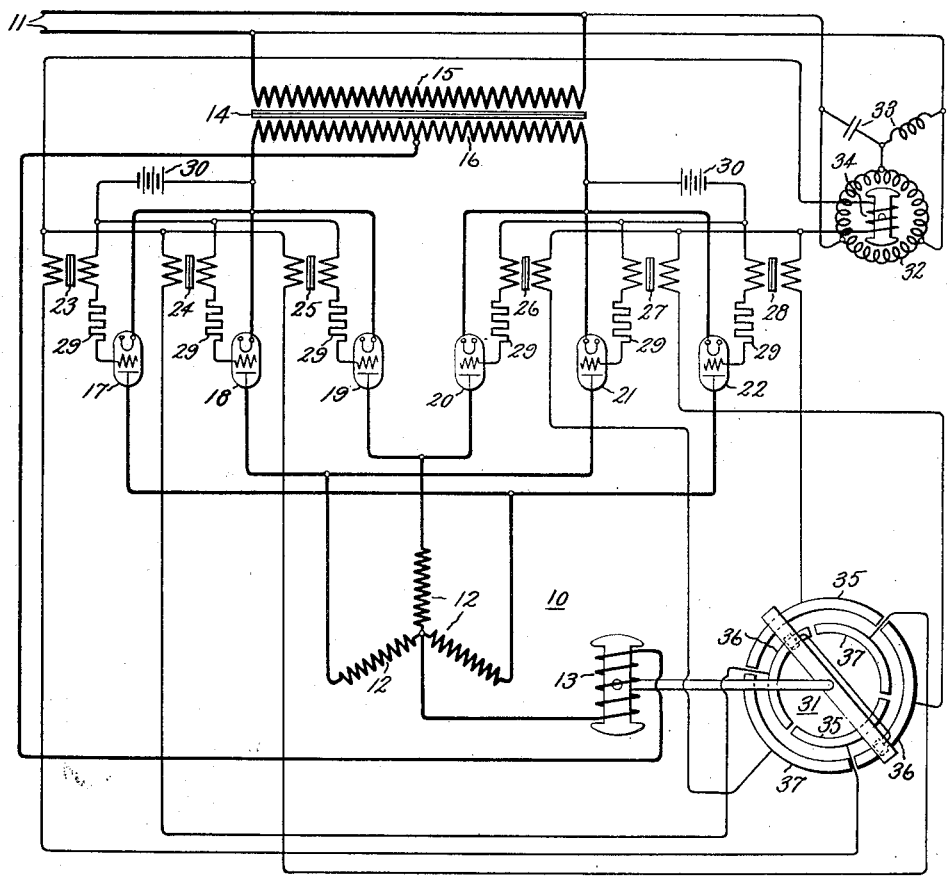

Nov. 28, 1933.　　　C. H. WILLIS　　　1,937,370
ELECTRIC VALVE CONVERTING SYSTEM
Filed March 12, 1932　　　3 Sheets-Sheet 1

Inventor:
Clodius H. Willis,
by Charles E. Mullen
His Attorney.

Nov. 28, 1933.  C. H. WILLIS  1,937,370
ELECTRIC VALVE CONVERTING SYSTEM
Filed March 12, 1932   3 Sheets-Sheet 2
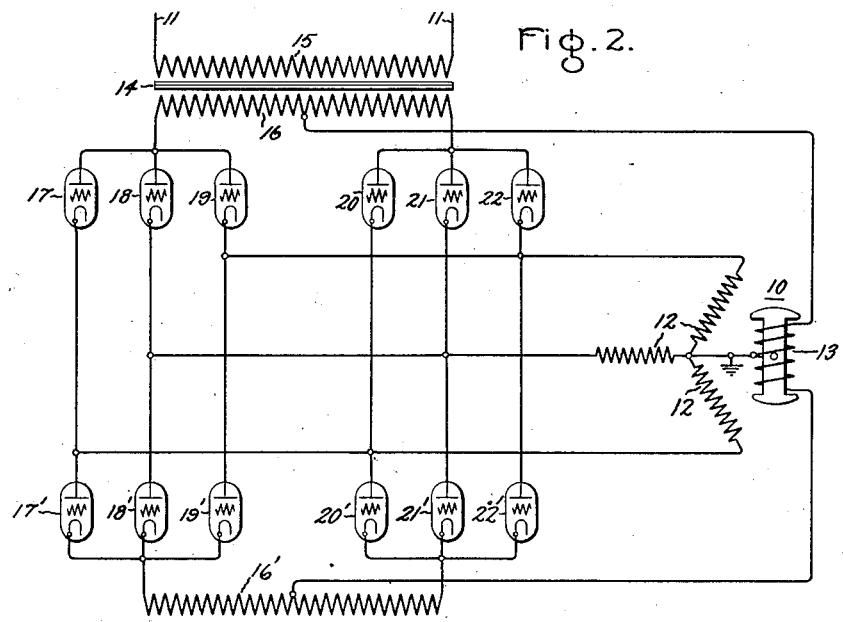
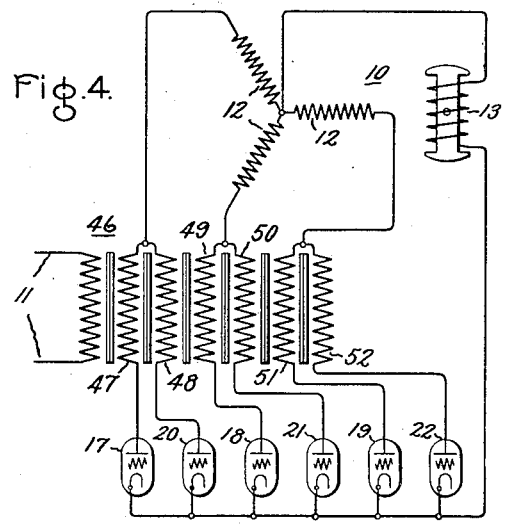
Inventor:
Clodius H. Willis,
by Charles W. Mullan
His Attorney.

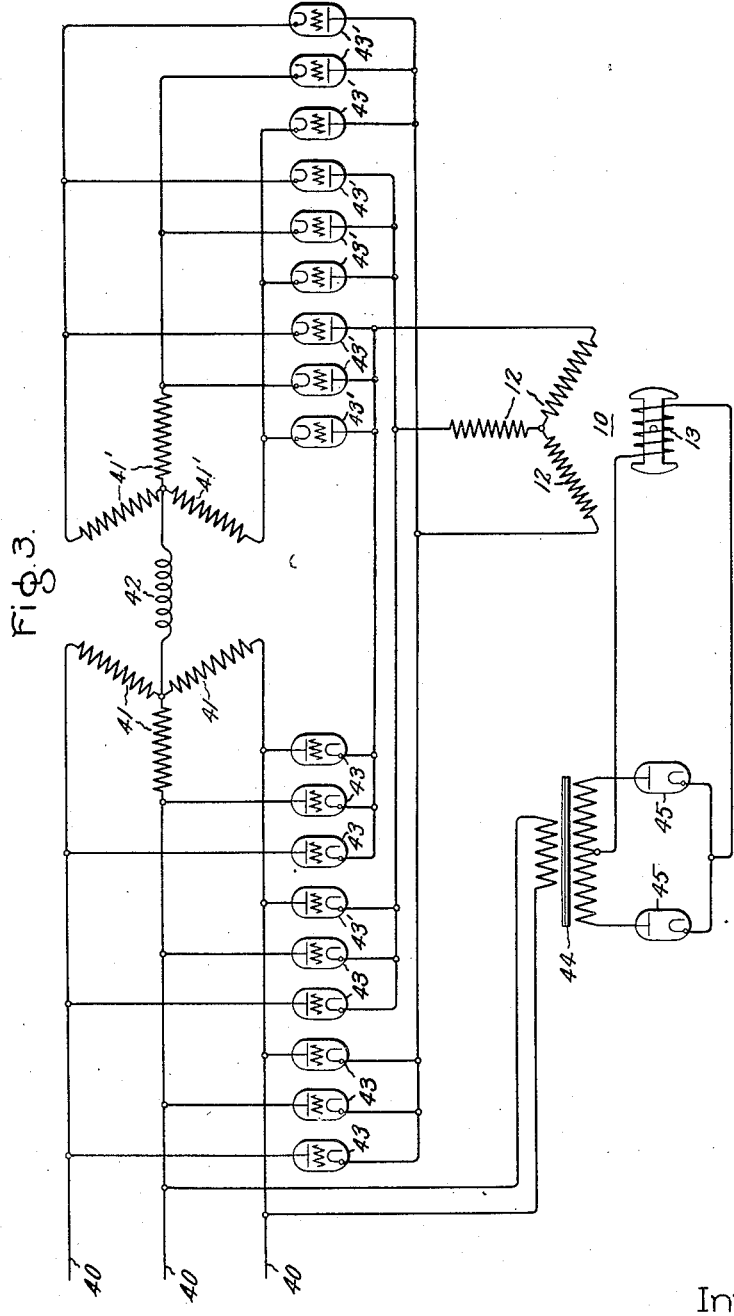

Patented Nov. 28, 1933

1,937,370

UNITED STATES PATENT OFFICE 1,937,370

ELECTRIC VALVE CONVERTING SYSTEM

Clodius H. Willis, Princeton, N. J., assignor to General Electric Company, a corporation of New York Application March 12, 1932. Serial No. 598,518

7 Claims. (Cl. 172—274)

My invention relates to electric valve converting systems and more particularly to such systems including electric valves for transmitting energy from a source of alternating current to a variable frequency load device or circuit.

Heretofore there have been proposed numerous arrangements including electric valves for transmitting energy between alternating and direct current circuits or alternating current circuits of different frequencies or phases. In such electric valve converting systems the use of valves of the vapor electric discharge type has been found particularly advantageous because of the relatively large amounts of power which may be handled at ordinary operating voltages. The grid control circuits for the electric valves in such apparatus tend to become somewhat complicated and subject to occasional failures, while in such arrangements utilizing vapor electric discharge valves, the failure of a grid control circuit may occasion a short circuit either on the supply circuit or the load device or both. My invention is directed to an improved electric valve converting system which is of general application but which is particularly suitable for transmitting energy from a constant frequency alternating current source to a variable frequency alternating current motor.

It is an object of my invention, therefore, to provide an improved electric valve converting system for transmitting energy from an alternating current source to a variable frequency alternating current load device or circuit which will overcome the above mentioned disadvantages of the arrangements of the prior art and which will be simple and reliable in operation.

It is another object of my invention to provide an improved electric valve converting system, utilizing vapor electric valves provided with control grids, for transmitting energy from a source of alternating current to a variable frequency load device or circuit, in which the failure of the grid circuit of any of the electric valves will not occasion a short circuit on either the alternating current source or the load device or circuit.

In accordance with one embodiment of my invention, a polyphase alternating current motor having a star connected armature winding is connected for half wave operation from a source of alternating current through a plurality of electric valves interconnecting each of the phase windings of the motor with each of the terminals of the alternating current source, all of the valves being connected similarly with respect to the armature phase windings. The alternating current source is provided with an electrical neutral, as for example by means of a transformer, and this neutral is interconnected with a neutral of the armature winding through an excitation winding for the alternating current motor. In order to control the conductivity of the several electric valves there is provided means for deriving from said source an alternating potential variable in phase and this alternating potential is impressed upon the grids of the several electric valves through a distributor mounted on the shaft of the motor and so adjusted that excitation is supplied to the grids of the valves associated with the particular motor armature phase which is in a torque producing position with respect to the excitation winding. By properly varying the phase of the grid excitation the energization of the motor, and hence its speed, may be varied as desired. In case it is desired to connect the motor or load circuit for full wave operation there is provided a transformer energized from the alternating current source and comprising a pair of oppositely wound inductive networks, each provided with an electrical neutral. The connections for the motor terminals to each of the inductive networks is similar to the connections of the modification first described, while in the case of a motor of the synchronous type, the excitation winding is connected directly between the electrical neutrals of the two inductive networks.

For a better understanding of my invention, together with other and further objects thereof, reference is had to the following description taken in connection with the accompanying drawings, and its scope will be pointed out in the appended claims. In the drawings, Fig. 1 illustrates an arrangement embodying my invention for energizing a three phase alternating current motor of the synchronous type for half wave operation from a source of single phase alternating current; Fig. 2 illustrates a full wave arrangement similar to that of Fig. 1; Fig. 3 shows an arrangement similar to Fig. 2 suitable for operating from a three phase source of alternating current, while Fig. 4 shows a rearrangement of Fig. 1 to secure a single cathode potential for the several electric valves.

Referring now to Fig. 1 of the drawings, there is illustrated an arrangement for operating an alternating current motor 10 from a single phase alternating current supply circuit 11. The motor 10 may be of the induction or synchronous type, although the latter type is illustrated, and comprises a three phase star connected armature winding 12 and a rotatable field or exciting winding 13. The armature winding 12 is connected to be energized from the alternating current supply circuit 11 through a transformer 14 comprising a primary winding 15 connected to the circuit 11 and a secondary winding 16 provided with an electrical midpoint. The several terminals of the armature winding 12 are connected to one side of the winding 16 through electric valves 17, 18 and 19 and to the other side of the winding 16 through electric valves 20, 21 and 22, while the electrical neutral of the winding 16 is interconnected with the neutral of the armature winding 12 through the exciting winding 13, or in case the motor 10 is of the induction type, this winding may be omitted or may comprise a separate reactance external to the motor 10. The electric valves 17–22, inc., are each provided with an anode, a cathode and a control grid, and may be of any of the several types well known in the art, although I prefer to use valves of the vapor electric discharge type. The grids of the electric valves 17–22, inc., are connected to their respective cathodes through the secondary windings of grid transformers 23–28, inc., current limiting resistors 29 and negative bias batteries 30. In order to control the conductivities of the several electric valves in such a way as to deliver unidirectional current successively to the several phases of the armature winding 12, there is provided a phase shifting arrangement for deriving from the alternating current circuit 11 an alternating potential variable in phase and this alternating potential is impressed upon the primary windings of the several grid transformers through a distributor 31 driven by the motor shaft. The phase shifting arrangement may be of any of the several means well known in the art, although I have illustrated by way of example a rotary phase shifting transformer 32 energized from the circuit 11 through a phase splitting circuit 33 and provided with a secondary member 34 for exciting the grid transformers. The phase relation of the distributor 31 on the shaft of the motor 10 and the connections of the several segments are such that the grids of each pair of electric valves associated with a single phase of the armature winding 12 are excited during an interval in which the rotatable field winding 13 is in a torque producing position with respect to that particular phase; for example, the transformers 23 and 28 are energized through the segments 35, the transformers 24 and 27 through the segments 36 and the transformers 25 and 26 through the segments 37.

In explaining the operation of the above described apparatus, it will be assumed that initially the rotary phase shifting transformer 32 is so adjusted that the alternating potential impressed upon the several grid circuits is retarded substantially with respect to the potential of the alternating current circuit 11, and that the rotatable field winding 13 and distributor are in approximately the positions illustrated. Under these conditions, it is seen that the primary windings of the grid transformers 24 and 27 are serially connected across the secondary member 34 of the rotary phase shifting transformer 32 through the segments 36 of the distributor 31, while the grid circuits of the other grid transformers are de-energized except for the negative bias batteries 30, so that these valves are maintained non-conductive. The transformer winding 16, together with the valves 18 and 21, thus comprises a rectifier of the conventional form with the lower left hand phase winding of the armature 12 and the exciting winding 13 as the direct current load circuit. Under starting conditions when substantially zero counter-electromotive force is induced in the armature 12 by the exciting winding 13, the average voltage impressed upon the several phase windings of the armature 12 may be reduced to any desired value by properly adjusting the rotary phase shifting transformer 32. When the average voltage impressed upon the phase windings of the armature 12 has increased to such a value that the current therethrough produces a sufficient torque upon the rotor 13 to accelerate the connected load, the motor will begin to rotate. When it has advanced through approximately 120 electrical degrees the connections to the grid transformers 24 and 27 will be broken at the segments 36 and the transformers 23 and 28 will be similarly energized through the segments 35, thus rendering the valves 17 and 22 conductive to energize the lower right hand phase winding of the armature 12. In this way the current is successively commutated between the several phase windings of the armature 12 in such a way that, at any particular instant, only that particular phase winding is energized which is in a torque producing position with respect to the motor rotor. As the motor accelerates and gains in speed, the exciting winding 13 will induce a counter-electromotive force in the armature winding 12 to reduce the input to the motor and establish a state of equilibrium. Thus, it is seen that the frequency of the unidirectional current impulses supplied to the several phase windings of the motor 10 is varied automatically in accordance with the speed of the motor by the distributor mechanism 31, driven by the motor. However, this feature of controlling the conductivity of the electric valves by a distributor mechanism driven by the motor forms no part of my present invention but is disclosed and broadly claimed in a copending application of E. F. W. Alexanderson, Serial No. 638,361, filed May 11, 1923, and assigned to the same assignee as the present application. By properly advancing the phase of the grid potentials by means of the rotary phase shifting transformer 32, the energization of the motor 10 may be increased to any desired value and thus the speed of the motor may be controlled as desired. Under starting and low speed conditions when a large number of half cycles of the supply current are utilized to form a single current wave in each of the several phase windings of the armature 12, it will be well understood that the current in any particular phase winding is easily interrupted at the end of the last half cycle of the supply current when the alternating current passes through zero, due to the ability of the grids of vapor electric discharge valves to interrupt a current periodically passing through zero. This action may be referred to as frequency commutation. At higher motor speeds, however, the duration of the respective half cycles of the alternating current supply may be of the same order of magnitude as the duration of impulses to the several phase windings, and as the motor passes through synchronous speed, may become even shorter. Under these conditions, however, the field winding 13 will induce in the armature winding 12 a counter-electromotive force and, by properly adjusting the phase relation of the distributer 31, the commutation between the valves associated with one phase winding and the valves associated with another phase winding may be effected at a point in the cycle of counter-electromotive force when such counter-electromotive force is effective to secure the desired commutation. Such a transfer of current between the several electric valves is referred to as phase commutation. In this manner the motor may be operated from standstill up to and through synchronous speed to a speed limited only by the mechanical characteristics of the motor, the motor having speed torque characteristics similar to those of a series direct current machine.

In the arrangement of Fig. 1, the motor 10 is connected for half wave operation; that is, the several armature phase windings, which are connected to carry polyphase alternating current, carry intermittent unidirectional currents displaced in phase, which may be considered as half waves of a predetermined polarity of a polyphase alternating current. In Figs. 2 and 3, there are shown modifications of my invention as applied to full wave operation of a polyphase alternating current motor of the type illustrated in Fig. 1. In these arrangements there is required a supply transformer provided with two oppositely wound inductive networks which may be a pair of secondary windings for a single primary winding, or which may be one primary winding and one secondary winding; for example, in the arrangement of Fig. 2 the transformer 14 of Fig. 1 is provided with an additional secondary network or winding 16' provided with an electrical midpoint, and the several phases of the motor armature 12 are connected therewith through the electric valves 17'-22', inc., in a manner similar to their connection to the secondary winding 16. In this arrangement the field winding 13 is interconnected between the electrical midpoints of the windings 16 and 16'. The grids of the several electric valves may be controlled as in the arrangement of Fig. 1. In this arrangement two of the phase windings of the armature 12 are conducting at any given instant, the current entering one phase winding and flowing out through the other, and the commutations of the current entering the armature and that leaving the armature are displaced in phase substantially 60 electrical degrees. For example, it may be assumed that initially electric valves 19 and 18' are conductive, and that the left hand terminal of the winding 16 is positive and the left hand terminal of the winding 16' is negative. Current will then flow from the right hand terminal of the winding 16 through electric valve 19, the upper and left hand phase windings of the armature 12 as illustrated in the figure, electric valve 18', left hand portion of the winding 16', the exciting winding 13 to the electrical neutral of the winding 16, thus completing the circuit. When the polarity of the supply circuit reverses, current will be automatically transferred through a similar circuit including electric valves 22 and 21'. Substantially 60 electrical degrees later the current will be commutated from the valve 18' to the valve 17' and from the valve 21' to the valve 20', thus exciting the lower phase winding of the armature 12 and advancing the resultant magnetomotive force of the motor by substantially 60 electrical degrees. In this way the resultant magnetomotive force will be successively advanced in 60 degree increments and the motor will accelerate as in the arrangement described in connection with Fig. 1.

Fig. 3 is an extension of the arrangement of Fig. 2 to a three phase alternating current supply circuit 40. In this arrangement the secondary networks or windings 16 and 16' are replaced by a one to one ratio Y-connected transformer comprising the three phase networks 41 and 41' the electrical neutrals of which are interconnected through an inductive winding 42 which may be utilized as an exciting winding for the motor 10, as in the arrangement of Fig. 2, in case it is desired to give the motor series characteristics. In this arrangement the several phase terminals of the armature winding 12 are connected to one of the inductive networks 41 through a group of electric valves 43 and to the inductive network 41' through a second group of electric valves 43' connected oppositely to the first group of electric valves with respect to the armature winding 12. In this arrangement the motor 10 is given shunt characteristics by energizing the exciting winding 13 directly from the alternating current circuit 40 through an auxiliary rectifier comprising a transformer 44 and electric valves 45. In other respects the operation of this arrangement is similar to that of Fig. 2.

Fig. 4 illustrates a modification of the arrangement of Fig. 1 which provides the several electric valves with a single cathode potential, an arrangement which is particularly suitable for operation with a multiple anode, single cathode electric valve, such for example as a grid controlled mercury arc rectifier. In this arrangement, the transformer 14 of Fig. 1 is replaced by a transformer 46 provided with three pairs of secondary windings 47—48, 49—50 and 51—52, associated with the several phases of the armature winding 12, the two windings of each pair being oppositely connected so that they are active on alternate half cycles of the supply current. In other respects the characteristics and operation are similar to that of the arrangement described in connection with Fig. 1.

While I have illustrated my invention as embodied in arrangements for transmitting energy from single phase or three phase alternating current supply circuits to a three phase alternating current motor, it will be obvious to those skilled in the art that my invention is of general application to arrangements for transmitting energy from alternating current supply circuits of any number of phases to alternating current motors of any number of phases.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. An electric valve converting system comprising an alternating current supply circuit provided with an electrical neutral, a polyphase alternating current motor provided with a star connected armature winding, an exciting winding for said motor connected between said neutral and the neutral of said armature winding, an electric valve interconnecting each of the motor armature terminals with each of the supply terminals, all of said valves being similarly connected with respect to said armature winding, and means for controlling the conductivity of said valves to transmit unidirectional current successively to each of the armature terminals.

2. An electric valve converting system comprising a source of alternating current provided with an electrical neutral, an alternating current motor comprising a plurality of phase windings having a common neutral, a circuit carrying substantially pure direct current interconnecting the electrical neutral of said source and that of said phase winding, a plurality of similarly connected electric valves interconnecting each terminal of said source and each of said phase windings to supply rectified current thereto, each of said valves being provided with a control grid, and a distributor driven by said motor for successively exciting the grids of the valves associated with successive phase windings.

3. An electric valve converting system comprising a source of alternating current provided with an electrical neutral, an alternating current motor comprising a plurality of phase windings having a common neutral, a connection between the electrical neutral of said source and that of said phase windings, a plurality of similarly connected electric valves interconnecting said source and each of said phase windings to supply rectified current thereto, each of said valves being provided with a control grid, a source of alternating potential derived from said source of alternating current, a distributor driven by said motor for successively exciting the grids of the valves associated with successive phase windings with said alternating potential, and means for shifting the phase of said alternating potential to vary the energization of said motor.

4. An electric valve converting system comprising a source of alternating current provided with an electrical neutral, an alternating current motor comprising a plurality of phase windings connected to a common electrical neutral, a circuit carrying substantially pure direct current interconnecting said neutrals, a group of similarly connected electric valves interconnecting each terminal of said source with each of the several phase windings of said apparatus to supply rectified current thereto, and means for controlling the conductivity of said valves to commutate the current between successive phase windings.

5. An electric valve converting system comprising a source of alternating current provided with an electrical neutral, an alternating current motor comprising a plurality of phase windings connected to a common electrical neutral, an exciting winding for said motor connected between said electrical neutrals, a group of similarly connected electric valves interconnecting each terminal of said source with each of the several phase windings of said apparatus to supply rectified current thereto, each of said valves being provided with a control grid, and a distributor mounted on the motor shaft for successively exciting the grids of the valves associated with a phase winding in torque producing position with respect to said exciting winding.

6. An electric valve converting system comprising an alternating current supply circuit, a transformer energized therefrom and comprising two oppositely wound inductive networks each provided with an electrical neutral, an alternating current motor comprising a plurality of phase windings having a common neutral, a connection between the neutrals of said networks and said phase windings, a group of similarly connected electric valves interconnecting each of said phase windings with each of the terminals of one of said inductive networks, a second group of similarly connected electric valves interconnecting each of said phase windings with each of the terminals of the other of said inductive networks, said groups of valves being oppositely connected with respect to said phase windings, and means for controlling the conductivity of said valves.

7. An electric valve converting system comprising an alternating current supply circuit, a transformer energized therefrom and comprising a pair of oppositely wound inductive networks each provided with an electrical neutral, an alternating current motor comprising a plurality of phase windings provided with an electrical neutral and an exciting winding, said exciting winding being connected between the neutrals of said networks, a connection from said excitation winding to the neutral of said phase windings, a group of similarly connected electric valves interconnecting each of said phase windings with each of the terminals of one of said inductive networks, a second group of similarly connected electric valves interconnecting each of said phase windings with each of the terminals of the other of said inductive networks, said groups of valves being oppositely connected with respect to said phase windings, and means for controlling the conductivity of said valves.

CLODIUS H. WILLIS.